(12) United States Patent
Zhang et al.

(10) Patent No.: US 10,185,448 B2
(45) Date of Patent: Jan. 22, 2019

(54) TOUCH CONTROL LIQUID CRYSTAL DISPLAY DEVICE AND ELECTRONIC APPARATUS

(71) Applicant: WUHAN CHINA STAR OPTOELECTRONICS TECHNOLOGY CO., LTD., Wuhan, Hubei (CN)

(72) Inventors: Zhou Zhang, Wuhan (CN); Chang Cao, Wuhan (CN); Changwen Ma, Wuhan (CN); Yu-cheng Tsai, Wuhan (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 309 days.

(21) Appl. No.: 15/039,214

(22) PCT Filed: Apr. 5, 2016

(86) PCT No.: PCT/CN2016/078497
§ 371 (c)(1),
(2) Date: May 25, 2016

(87) PCT Pub. No.: WO2017/156804
PCT Pub. Date: Sep. 21, 2017

(65) Prior Publication Data
US 2018/0081463 A1    Mar. 22, 2018

(30) Foreign Application Priority Data
Mar. 15, 2016 (CN) .......................... 2016 1 0145864

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1368* (2013.01); *G02F 1/13439* (2013.01);
(Continued)

(58) Field of Classification Search
CPC ...... G06F 3/044; G06F 3/0412; G06F 3/0416; G06F 2203/04108; G02F 1/133308;
(Continued)

(56) References Cited

U.S. PATENT DOCUMENTS

| | | | |
|---|---|---|---|
| 2010/0053103 A1 | 3/2010 | No et al. | |
| 2017/0235414 A1* | 8/2017 | Ding | G06F 3/0416 345/174 |

FOREIGN PATENT DOCUMENTS

| | | |
|---|---|---|
| CN | 104992627 A | 10/2015 |
| CN | 105068695 | 11/2015 |

(Continued)

OTHER PUBLICATIONS

International Search Report for PCT/CN2016/078497, Completed by the Chinese Patent Office dated Aug. 5, 2016, 12 Pages.

*Primary Examiner* — Abhishek Sarma
(74) *Attorney, Agent, or Firm* — Mintz Levin Cohn Ferris Glovsky and Popeo, P.C.; Kongsik Kim; Jhongwoo Jay Peck

(57) ABSTRACT

A touch control liquid crystal display device, having a display panel and a backlight module disposed opposite each other and a middle frame supporting the panel and module. The panel includes an array and a filter substrate disposed opposite each other and a liquid crystal layer disposed there-between; wherein, a driving electrode layer is disposed on the array substrate, a first induction electrode layer is disposed on the filter substrate, the driving electrode layer and the first induction electrode layer constitute a capacitive touch control structure. Wherein, a second induction elec-
(Continued)

FIG. 1 trode layer is disposed on a side of the middle frame facing the module, there is a gap between the second induction electrode layer and the module. The second induction electrode layer and the driving electrode layer constitute a capacitive induction mechanism to induct a pressure signal applied on the panel. An electronic apparatus including the above device is also disclosed.

18 Claims, 2 Drawing Sheets

(51) Int. Cl.
*G02F 1/1335* (2006.01)
*G02F 1/1343* (2006.01)
*G02F 1/1368* (2006.01)
*G06F 3/041* (2006.01)

(52) U.S. Cl.
CPC .. *G02F 1/133308* (2013.01); *G02F 1/133514* (2013.01); *G06F 3/0412* (2013.01); *G06F 3/0416* (2013.01); *G02F 2001/133302* (2013.01); *G02F 2001/133317* (2013.01); *G02F 2201/121* (2013.01); *G06F 2203/04108* (2013.01)

(58) Field of Classification Search
CPC ............... G02F 1/13439; G02F 1/1368; G02F 1/133514; G02F 2201/121; G02F 2001/133317; G02F 2001/133302
See application file for complete search history.

(56) References Cited

FOREIGN PATENT DOCUMENTS

| | | |
|---|---|---|
| CN | 204926052 | 12/2015 |
| CN | 204926053 | 12/2015 |
| CN | 204965399 U | 1/2016 |
| CN | 205015863 | 2/2016 |

* cited by examiner

TOUCH CONTROL LIQUID CRYSTAL DISPLAY DEVICE AND ELECTRONIC APPARATUS

CROSS-REFERENCE TO RELATED APPLICATION

This application is the U.S. national phase of PCT Application No. PCT/CN2016/078497 filed on Apr. 5, 2016, which claims priority to CN Patent Application No. 201610145864.1 filed on Mar. 15, 2016, the disclosures of which are incorporated in their entirety by reference herein.

TECHNICAL FIELD

The present invention relates to a display technical field, and particularly, to a touch control liquid crystal display device and an electronic apparatus including the liquid crystal display device.

BACKGROUND ART

With development and progress of a technology of a mobile electronic product apparatus, a use of a touch screen is particularly important. At present, there are many different touch control inductive technologies, mainly such as a capacitive touch screen, which mainly lies in identifying plane location information touched by a finger (to accurately calculate a location of a touch point by obtaining capacitance changes of the point in an X-axis direction electrode and a Y-axis direction electrode). As a requirement for a touch technology by the people improves continuously, an ideal touch screen not only needs to induct the touched plane location information, but also needs to induct a touched vertical pressure (in a Z-axis direction), so as to realize converting a traditional interpersonal interaction form from a two-dimensional (2D) mode to a three-dimensional (3D) mode.

However, now the touch display devices having pressure induction and touch control functions mainly are achieved by additionally increasing a plurality of pressure sensors in a display such as a liquid crystal display, such design needs to greatly change a structure design of the display itself, and the structure is more complex, process is more difficult. The pressure sensor has a limited space resolution, and when increasing a plurality of pressure sensors, a display quality of the display will be affected.

SUMMARY

In view of this, the present invention provides a touch control liquid crystal display device, and uses a simple structure to realize a pressure induction and touch control function in the liquid crystal display device, thereby reducing a cost.

In order to achieve the above purpose, the present invention adopts the following technical solutions:

A touch control liquid crystal display device includes a display panel and a backlight module disposed opposite to each other and a middle frame to support the display panel and the backlight module, the display panel includes an array substrate and a filter substrate disposed opposite to each other and a liquid crystal layer disposed there-between; a driving electrode layer is disposed on the array substrate, a first induction electrode layer is disposed on the filter substrate, the driving electrode layer and the first induction electrode layer constitute a capacitive touch control structure, wherein, a second induction electrode layer is disposed on a side of the middle frame facing the backlight module, there is a gap between the second induction electrode layer and the backlight module, and the second induction electrode layer and the driving electrode layer constitute a capacitive induction mechanism to induct a pressure signal applied on the display panel.

The array substrate includes a first glass substrate, a common electrode layer is disposed on a side of the first glass substrate close to the liquid crystal layer, and the common electrode layer is used as the driving electrode layer; in a display time of one frame, the common electrode layer is used to transfer a common electrode signal and a touch control driving signal in time-sharing.

A material of the common electrode layer is indium tin oxide (ITO).

The array substrate also includes a thin film transistor array, and the thin film transistor array is disposed between the first glass substrate and the common electrode layer.

The filter substrate includes a second glass substrate, and the first induction electrode layer is disposed on a side of the second glass substrate far from the liquid crystal layer.

A material of the first induction electrode layer is ITO.

The filter substrate also includes a color light blocking layer, and the color light blocking layer is disposed on a side of the second glass substrate close to the liquid crystal layer.

A material of the second induction electrode layer is ITO.

The touch control liquid crystal display device also includes a touch control chip, the touch control chip is used to provide the touch control driving signal to the driving electrode layer, and obtains a touch control induction signal from the first induction electrode layer and the second induction electrode layer, respectively.

The present invention also provides an electronic apparatus, and the electronic apparatus includes a housing and a liquid crystal display device packaged in the housing, wherein, the liquid crystal display device is the above touch control liquid crystal display device.

Compared with the prior art, on the basis of a mutual capacitive touch control structure of the existing 2D touch function, by disposing the second induction electrode layer between the middle frame and the backlight module and keeping a gap between the second induction electrode and the backlight module, the touch control liquid crystal display device provided by the embodiment of the present invention can ensure the liquid crystal display device to have a space for a deformation when it is pressed, and the second induction electrode layer and the existing driving electrode layer constitute the capacitive induction mechanism to induct the pressure signal applied on the display panel, thereby realizing the 3D touch function, and the structure thereof is simple and is easily generated, of which production cost is low. Furthermore, a material of the increased second induction electrode layer is a transparent conductive ITO, which is disposed on a back surface of the backlight module, thus the display quality of the existing liquid crystal display device is not affected while realizing the 3D touch function.

DETAILED DESCRIPTION OF EXEMPLARY EMBODIMENTS

Technical solutions in embodiments of the present invention will be explained below in detail in conjunction with figures and specific embodiments, and obviously, the described embodiments only are a part of embodiments of the present invention, rather than the entire embodiments. Based on the embodiments of the present invention, all the other embodiments obtained by those skilled in the art on the premise that no creative effort is exerted, belong to scopes of the present invention.

Here, it also needs to explain that, in order to avoid blurring the present invention due to unnecessary details, the drawings only illustrate structures and/or processing steps closely related to the solution of the present invention, but other details having less relationship with the present invention are omitted.

Figure 1:
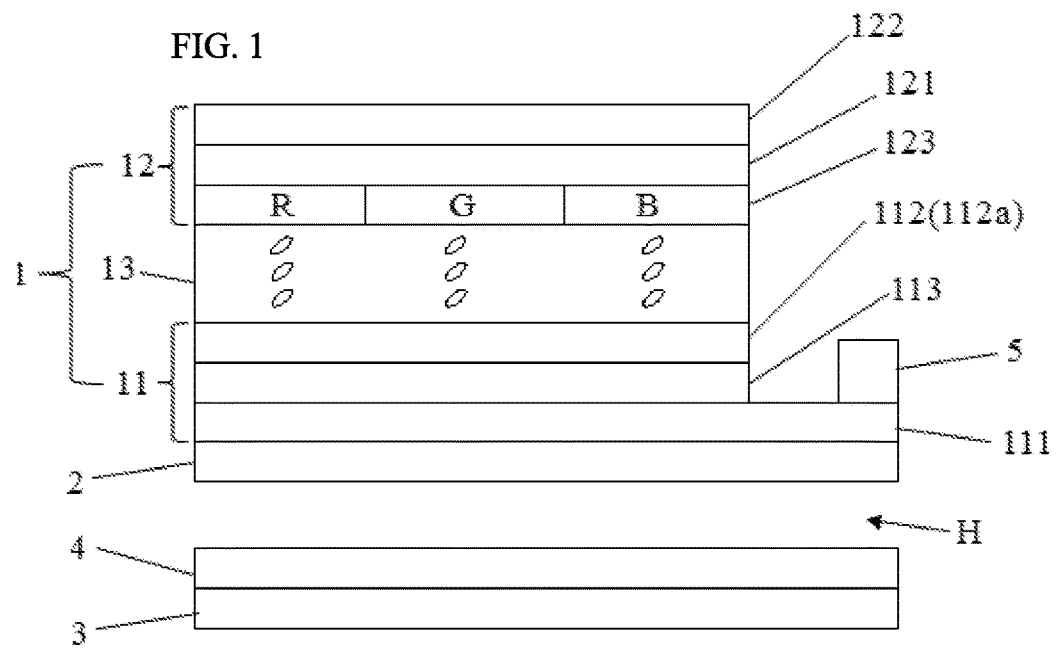
FIG. 1 is a structure schematic view of a liquid crystal display device provided by an embodiment of the present invention.

An embodiment of the present invention firstly provides a touch control liquid crystal display device, as shown in FIG. 1, the touch control liquid crystal display device includes a display panel 1 and a backlight module 2 disposed opposite to each other and a middle frame 3 to support the display panel 1 and the backlight module 2. The backlight module 2 provides a display light source to the display panel 1, so that the display panel 1 displays an image.

The display panel 1 includes an array substrate 11 and a filter substrate 12 disposed opposite to each other and a liquid crystal layer 13 disposed between the array substrate 11 and the filter substrate 12, wherein, the display panel 1 is disposed with a mutual capacitive touch control structure. The mutual capacitive touch control structure mainly includes a driving electrode and an induction electrode. In the existing mutual capacitive touch control structure, there are various arrangement manners (which include an in-cell structure and an on-cell structure) about the driving electrode and the induction electrode, which all can be applied to the technical solutions of the present invention. In the present embodiment, as shown in FIG. 1, a driving electrode layer 112 is disposed on the array substrate 11, a first induction electrode layer 122 is disposed on the filter substrate 12, and the driving electrode layer 112 and the first induction electrode layer 122 constitute a capacitive touch control structure.

In specific, referring to FIG. 1, the array substrate 11 includes a first glass substrate 111, a thin film transistor array 113 and a common electrode layer 112a are sequentially disposed on a side of the first glass substrate 111 close to the liquid crystal layer 13, wherein, the common electrode layer 112a is used as the driving electrode layer 112. In a display time of one frame, the common electrode layer 112a (i.e., the driving electrode layer 112) is used to transfer a common electrode signal and a touch control driving signal in time-sharing. The filter substrate 12 includes a second glass substrate 121, and the first induction electrode layer 122 is disposed on a side of the second glass substrate 121 far from the liquid crystal layer 13; furthermore, the filter substrate 12 also includes a color light blocking layer 123, and the color light blocking layer 123 is disposed on a side of the second glass substrate 121 close to the liquid crystal layer 13, wherein, the color light blocking layer 123 includes a red light blocking R, a green light blocking G and a blue light blocking B.

A data line, a scan line and a pixel electrode also are disposed in the array substrate 11, and a black matrix etc. is also disposed in the filter substrate 12. A correlation between these structures and the structure to be improved in the present invention are not very close, and thus, the figures do not show these structures, which will not be explained in detail either.

Furthermore, in the present embodiment, as shown in FIG. 1, a second induction electrode layer 4 is disposed on a side of the middle frame 3 facing the backlight module 2, there is a gap H between the second induction electrode layer 4 and the backlight module 2, and the second induction electrode layer 4 and the driving electrode layer 112 constitute a capacitive induction mechanism to induct a pressure signal applied on the display panel 1.

Furthermore, the touch control liquid crystal display device also includes a touch control chip 5, the touch control chip 5 is electrically connected to the driving electrode layer 112, the first induction electrode layer 122 and the second induction electrode layer 4 respectively via a signal line (e.g., a flexible printed circuit (FPC)), to provide the touch control driving signal to the driving electrode layer 112, and obtains a touch control induction signal from the first induction electrode layer 122 and the second induction electrode layer 4, respectively.

Figure 2:
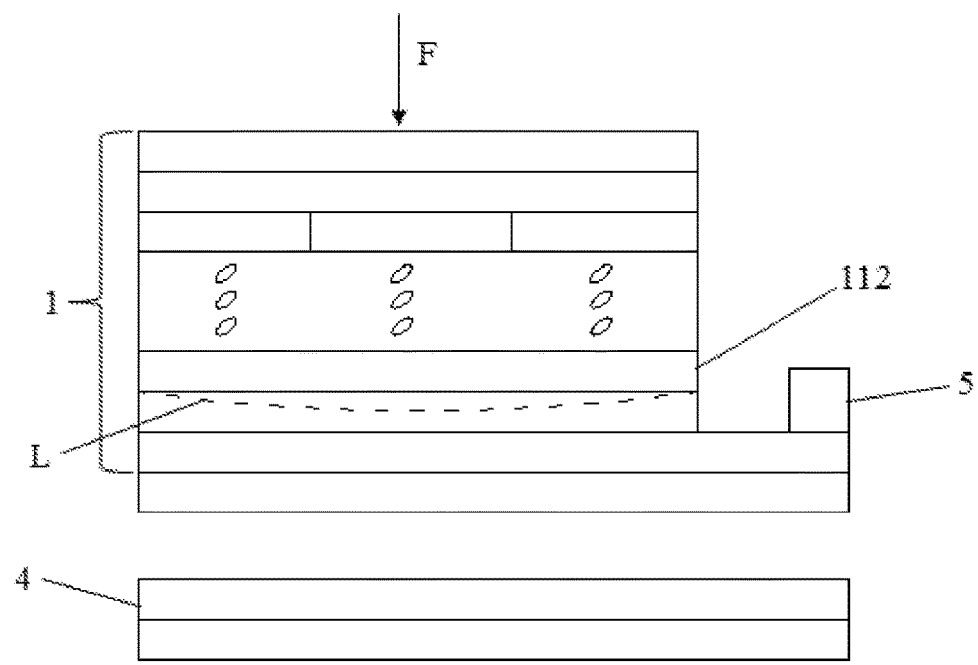
FIG. 2 is an exemplary view of the liquid crystal display device that is deformed when being pressed provided by an embodiment of the present invention.

In specific, referring to FIGS. 1 and 2, in a display time of one frame, during a display timing, the common electrode layer 112a (i.e., the driving electrode layer 112) transfers the common electrode signal, and the display panel 1 displays the image; during a touch control timing, the common electrode layer 112a (i.e., the driving electrode layer 112) transfers the touch control driving signal, and the capacitive touch control structure constituted by the driving electrode layer 112 and the first induction electrode layer 122 can induct the touched location. Furthermore, as shown in FIG. 2, when the touched finger uses F to press the display panel 1, the display panel 1 is deformed, the driving electrode layer 112 in the display panel 1 is also deformed accordingly (a state that the driving electrode layer 112 is deformed is indicated by a dotted line L as shown in FIG. 2), a distance between the driving electrode layer 112 and the second induction electrode layer 4 is reduced, a capacitance of the capacitive induction mechanism constituted by the second induction electrode layer 4 and the driving electrode layer 112 is changed accordingly, and by establishing a correlation between a capacitance change value and a pressure value, pressure information of the display panel 1 can be obtained after the touch chip 5 obtains a capacitance change signal from the second induction electrode layer 4, so as to realize the 3D touch function.

The gap H between the second induction electrode layer 4 and the backlight module 2 should ensure that the liquid crystal display device has enough deformation space when it is pressed.

Materials of the common electrode layer 112a (i.e., the driving electrode layer 112), the first induction electrode layer 122 and the second induction electrode layer 4 all are indium tin oxide (ITO).

Figure 3:
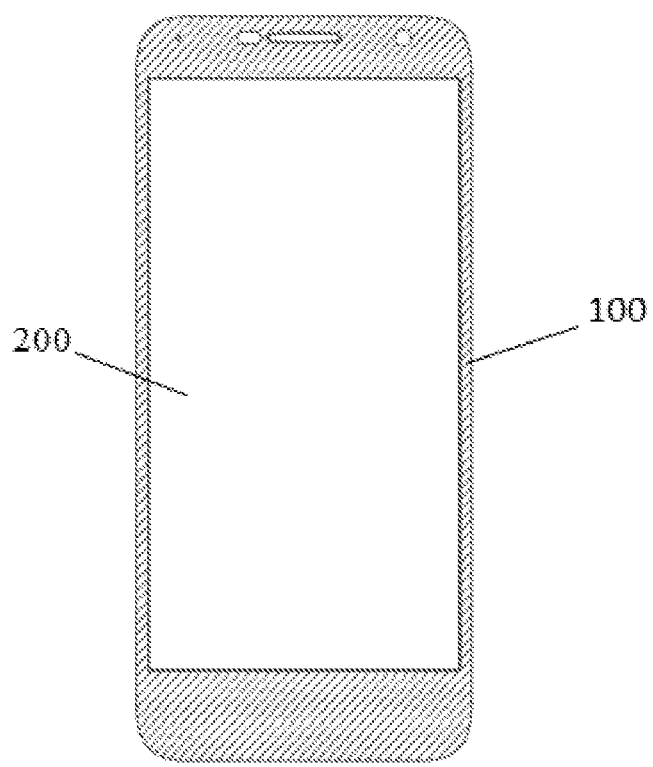
FIG. 3 is a structure schematic view of an electronic apparatus provided by an embodiment of the present invention.

The present invention also provides an electronic apparatus, as shown in FIG. 3, the electronic apparatus includes a housing 100 and a liquid crystal display device 200 packaged in the housing 100, wherein, the liquid crystal display device 200 is a touch control liquid crystal display device provided by the above embodiment. The electronic apparatus may be a mobile phone, a flat computer, a smart watch, a smart speaker and so on.

In summary, on the basis of a mutual capacitive touch control structure of the existing 2D touch function, by disposing the second induction electrode layer between the middle frame and the backlight module and keeping a gap between the second induction electrode and the backlight module, the touch control liquid crystal display device provided by the embodiment of the present invention can ensure the liquid crystal display device to have a space for a deformation when it is pressed, and the second induction electrode layer and the existing driving electrode layer constitute the capacitive induction mechanism to induct the pressure signal applied on the display panel, thereby realizing the 3D touch function, and the structure thereof is simple and is easily generated, of which production cost is low. Furthermore, the material of the increased second induction electrode layer is a transparent conductive ITO, which is disposed on a back surface of the backlight module, thus the display quality of the existing liquid crystal display device is not affected while realizing the 3D touch function.

It should be explained that the relationship terms, such as first and second, etc., in the present text are only used for distinguishing one entity or operation from another entity or operation without requiring or implying any actual relation or sequence existing between these entities or operations. Moreover, the term "include", "contain" or any other variant means covering instead of exclusively including, so that the process, method, object or device including a series of factors not only includes those factors but also includes other factors that are not explicitly listed or further include inherent factors for this process, method, object or device. In the case where no more limitations are provided, the factors defined by the sentence "include one . . . " do not exclude additional identical factors existing in the process, method, object or device which includes the factors.

Obviously, the scope of the present invention is not limited to the above detailed modes of carrying out the invention, and those skilled in the art may make various changes and modifications to the invention without departing from the scope and spirit of the invention. As such, if these changes and modifications of the present invention belong to the scope of the claims of the present invention and equivalent technologies thereof, the present invention also intends to include these changes and modifications here.

The invention claimed is:

1. A touch control liquid crystal display device, comprising a display panel and a backlight module disposed opposite to each other and a middle frame to support the display panel and the backlight module, the display panel comprising an array substrate and a filter substrate disposed opposite to each other and a liquid crystal layer disposed there-between, wherein, a driving electrode layer is disposed on the array substrate, a first induction electrode layer is disposed on the filter substrate, the driving electrode layer and the first induction electrode layer constitute a capacitive touch control structure, and wherein, a second induction electrode layer is further disposed on a side of the middle frame facing the backlight module, there is a gap between the second induction electrode layer and the backlight module, and the second induction electrode layer and the driving electrode layer constitute a capacitive induction mechanism to induct a pressure signal applied on the display panel, wherein, the array substrate comprises a first glass substrate, a common electrode layer is disposed on a side of the first glass substrate close to the liquid crystal layer, and the common electrode layer is used as the driving electrode layer.

2. The touch control liquid crystal display device of claim 1, wherein, in a display time of one frame, the common electrode layer is used to transfer a common electrode signal and a touch control driving signal in time-sharing.

3. The touch control liquid crystal display device of claim 2, wherein, a material of the common electrode layer is indium tin oxide (ITO).

4. The touch control liquid crystal display device of claim 2, wherein, the array substrate also comprises a thin film transistor array, and the thin film transistor array is disposed between the first glass substrate and the common electrode layer.

5. The touch control liquid crystal display device of claim 1, wherein, the filter substrate comprises a second glass substrate, and the first induction electrode layer is disposed on a side of the second glass substrate far from the liquid crystal layer.

6. The touch control liquid crystal display device of claim 5, wherein, a material of the first induction electrode layer is ITO.

7. The touch control liquid crystal display device of claim 5, wherein, the filter substrate also comprises a color light blocking layer, and the color light blocking layer is disposed on a side of the second glass substrate close to the liquid crystal layer.

8. The touch control liquid crystal display device of claim 1, wherein, a material of the second induction electrode layer is ITO.

9. The touch control liquid crystal display device of claim 1, wherein, the touch control liquid crystal display device also comprises a touch control chip, and the touch control chip is used to provide the touch control driving signal to the driving electrode layer, and obtains a touch control induction signal from the first induction electrode layer and the second induction electrode layer, respectively.

10. An electronic apparatus, comprising a housing and a liquid crystal display device packaged in the housing, wherein the liquid crystal display device is a touch control liquid crystal display device, the touch control liquid crystal display device comprises a display panel and a backlight module disposed opposite to each other and a middle frame to support the display panel and the backlight module, and the display panel comprises an array substrate and a filter substrate disposed opposite to each other and a liquid crystal layer disposed there-between, wherein, a driving electrode layer is disposed on the array substrate, a first induction electrode layer is disposed on the filter substrate, the driving electrode layer and the first induction electrode layer constitute a capacitive touch control structure, and wherein, a second induction electrode layer is further disposed on a side of the middle frame facing the backlight module, there is a gap between the second induction electrode layer and the backlight module, and the second induction electrode layer and the driving electrode layer constitute a capacitive induction mechanism to induct a pressure signal applied on the display panel, wherein, the array substrate comprises a first glass substrate, a common electrode layer is disposed on a side of the first glass substrate close to the liquid crystal layer, and the common electrode layer is used as the driving electrode layer.

11. The electronic apparatus of claim 10, wherein, in a display time of one frame, the common electrode layer is used to transfer a common electrode signal and a touch control driving signal in time-sharing.

12. The electronic apparatus of claim 11, wherein, a material of the common electrode layer is indium tin oxide (ITO).

13. The electronic apparatus of claim 11, wherein, the array substrate also comprises a thin film transistor array, and the thin film transistor array is disposed between the first glass substrate and the common electrode layer.

14. The electronic apparatus of claim 10, wherein, the filter substrate comprises a second glass substrate, and the first induction electrode layer is disposed on a side of the second glass substrate far from the liquid crystal layer.

15. The electronic apparatus of claim 14, wherein, a material of the first induction electrode layer is ITO.

16. The electronic apparatus of claim 14, wherein, the filter substrate also comprises a color light blocking layer, and the color light blocking layer is disposed on a side of the second glass substrate close to the liquid crystal layer.

17. The electronic apparatus of claim 10, wherein, a material of the second induction electrode layer is ITO.

18. The electronic apparatus of claim 10, wherein, the touch control liquid crystal display device also comprises a touch control chip, and the touch control chip is used to provide the touch control driving signal to the driving electrode layer, and obtains a touch control induction signal from the first induction electrode layer and the second induction electrode layer, respectively.

* * * * *